United States Patent
Washio et al.

(10) Patent No.: US 12,371,049 B2
(45) Date of Patent: Jul. 29, 2025

(54) INFORMATION PROCESSING DEVICE AND METHOD

(71) Applicant: TOYOTA JIDOSHA KABUSHIKI KAISHA, Toyota (JP)

(72) Inventors: Kota Washio, Shizuoka-ken (JP); Hinata Ichikawa, Nagoya (JP); Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 18/492,091

(22) Filed: Oct. 23, 2023

(65) Prior Publication Data
US 2024/0239364 A1    Jul. 18, 2024

(30) Foreign Application Priority Data
Jan. 18, 2023    (JP) .................... 2023-006193

(51) Int. Cl.
| | | |
|---|---|---|
| B60Q 1/00 | (2006.01) | |
| B60W 50/14 | (2020.01) | |
| G07C 5/00 | (2006.01) | |
| G07C 5/08 | (2006.01) | |

(52) U.S. Cl.
CPC ............ B60W 50/14 (2013.01); G07C 5/008 (2013.01); G07C 5/0808 (2013.01); G07C 5/0825 (2013.01); B60W 2050/146 (2013.01); B60W 2556/40 (2020.02); B60W 2556/45 (2020.02)

(58) Field of Classification Search
CPC .......... B60W 50/14; B60W 2050/146; B60W 2556/40; B60W 2556/45; G07C 5/008; G07C 5/0808; G07C 5/0825; G16C 20/20; G16C 20/90; G06Q 50/26
USPC ............... 340/439, 438, 425.5, 457, 905
See application file for complete search history.

(56) References Cited

U.S. PATENT DOCUMENTS

| | | | | |
|---|---|---|---|---|
| 8,855,895 | B2* | 10/2014 | Gerhardt | B60P 3/07 701/123 |
| 2013/0231854 | A1* | 9/2013 | Rovik | B60R 16/0236 701/1 |
| 2014/0282172 | A1* | 9/2014 | Bull | G06Q 10/06 715/771 |
| 2022/0289204 | A1 | 9/2022 | Manabe | |
| 2023/0078558 | A1* | 3/2023 | Sugiyama | G06Q 30/0207 701/123 |

FOREIGN PATENT DOCUMENTS

JP    2022-138727 A    9/2022

* cited by examiner

*Primary Examiner* — Anh V La
(74) *Attorney, Agent, or Firm* — SoraIP, Inc.

(57) ABSTRACT

The server obtains a first reduction amount of carbon dioxide emitted from the vehicle group and converts the first reduction amount of carbon dioxide into a first amount of the biological group. The server acquires a second reduction amount of carbon dioxide emitted from the first vehicle by driving of the first user associated with the first vehicle included in the vehicle group, and acquires a contribution degree of the first user in the first amount of the biological group based on the second reduction amount of carbon dioxide. The server causes the predetermined display device to display information indicating the first amount of the biological group and the degree of contribution of the first user.

5 Claims, 7 Drawing Sheets

FIG. 4

CO2 REDUCED VOLUME DATA (X-YEAR AND Y-MONTHS)

| USER ID | VEHICLE ID | GROUPING ID | MILEAGE | CO2 REDUCTION |
|---|---|---|---|---|
| U001 | V001 | G001 | | |
| U002 | V001 | G001 | | |
| U003 | V001 | G001 | | |
| U004 | V001 | G001 | | |

⋮

INFORMATION PROCESSING DEVICE AND METHOD

CROSS-REFERENCE TO RELATED APPLICATION

This application claims priority to Japanese Patent Application No. 2023-006193 filed on Jan. 18, 2023 incorporated herein by reference in its entirety.

BACKGROUND

1. Technical Field

The present disclosure relates to the reduction of carbon dioxide emissions caused by travel of a vehicle.

2. Description of Related Art

A technique is disclosed in which a physical quantity that changes based on at least one of traveling, steering, and braking of a vehicle or a physical quantity that changes when a predetermined operation member is operated is detected, and a score of a driving operation is calculated based on a detected value (for example, Japanese Unexamined Patent Application Publication No. 2022-138727 (JP 2022-138727 A)).

SUMMARY

An issue of an aspect of the present disclosure is to provide an information processing device and a method capable of improving interest in reducing carbon dioxide emissions for a driver of a vehicle.

An aspect of the present disclosure is an information processing device that includes a control unit that executes:
- acquiring a first reduction amount of carbon dioxide emitted from a vehicle group;
- acquiring a second reduction amount of carbon dioxide emitted from a first vehicle included in the vehicle group through driving by a first user associated with the first vehicle;
- converting the first reduction amount of carbon dioxide into a first amount of a biological group;
- acquiring a degree of contribution of the first user in the first amount of the biological group based on the second reduction amount of carbon dioxide; and
- displaying, on a predetermined display device, information indicating the first amount of the biological group and the degree of contribution of the first user.

Another aspect of the present disclosure is a method in which a computer executes:
- acquiring a first reduction amount of carbon dioxide emitted from a vehicle group;
- acquiring a second reduction amount of carbon dioxide emitted from a first vehicle included in the vehicle group through driving by a first user associated with the first vehicle;
- converting the first reduction amount of carbon dioxide into a first amount of a biological group;
- acquiring a degree of contribution of the first user in the first amount of the biological group based on the second reduction amount of carbon dioxide; and
- displaying, on a predetermined display device, information indicating the first amount of the biological group and the degree of contribution of the first user.

According to the aspect of the present disclosure, it is possible to improve interest in reducing the carbon dioxide emissions for the driver of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating exemplary information on $CO_2$ reduction amounts of the vehicles in the month of X years and Y months held in $CO_2$ reduction amount information DB;

DETAILED DESCRIPTION OF EMBODIMENTS

Figure 1:
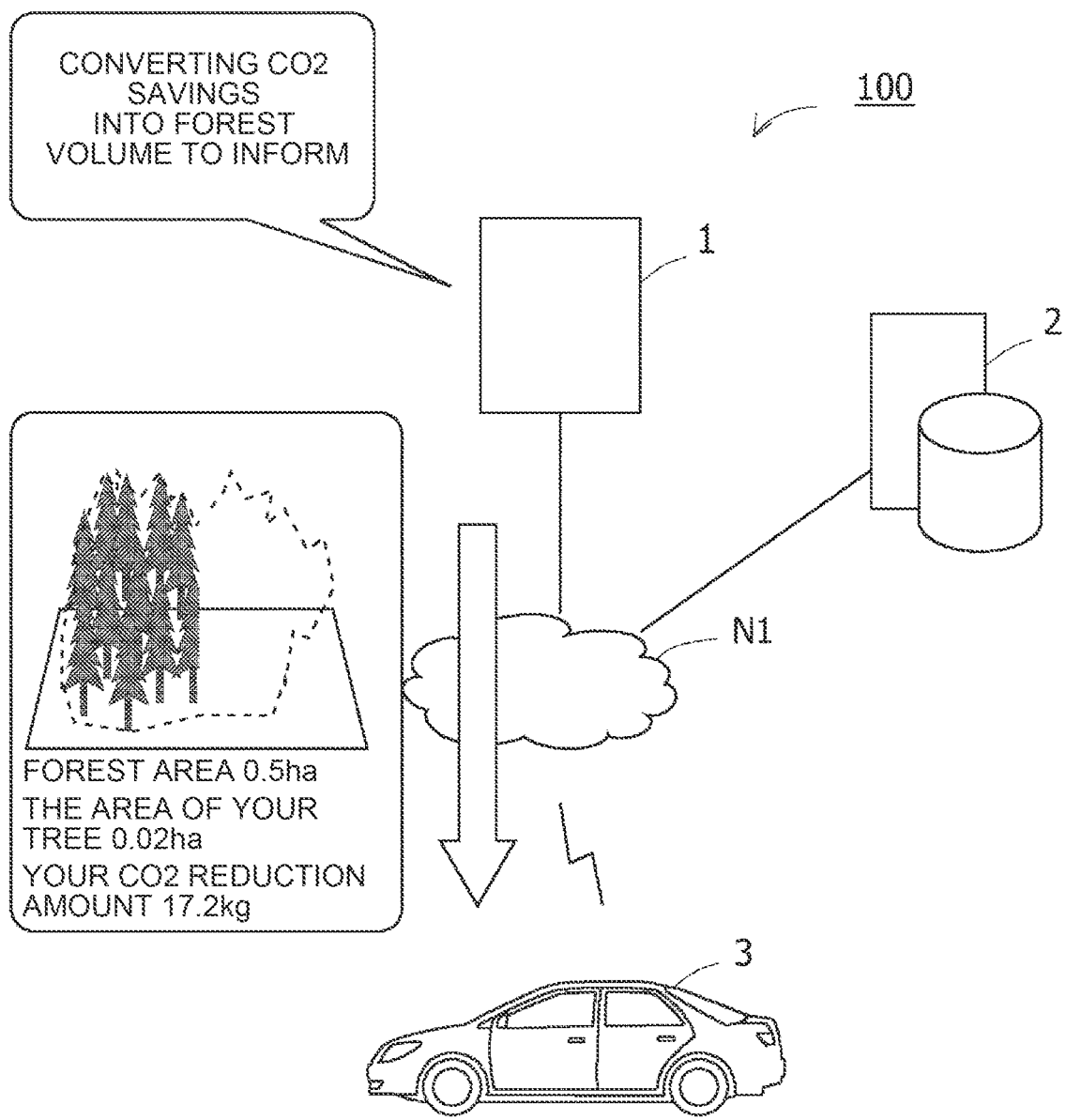
FIG. 1 is a diagram illustrating an example of a configuration of a driving diagnosis system according to a first embodiment.

Presenting the evaluation result of the driving operation is useful for raising the consciousness for the safe driving of the driver, improving the driving skill of the driver, and reducing the traffic accident. However, drivers may become more and more tired. Therefore, in addition to the service of evaluating the driving operation, by providing an evaluation of the contribution to the environmental problem due to the traveling of the vehicle as another viewpoint, it is expected to maintain the interest in the evaluation of the driving operation of the driver.

One aspect of the present disclosure employs a reduction in carbon dioxide emissions from vehicle travel as a contribution to environmental issues from vehicle travel. In one aspect of the present disclosure, the reduced amount of carbon dioxide emitted from the vehicle group is converted into the amount of the biological group, and the amount of the biological group and the degree of contribution of one user are presented to the user.

More specifically, one embodiment of the present disclosure is an information processing device including a control unit. The control unit may acquire a first reduction amount of carbon dioxide emitted from the vehicle group, and convert the first reduction amount of carbon dioxide into a first amount of the biological group. The control unit may acquire a second reduction amount of carbon dioxide emitted from the first vehicle by driving of the first user associated with the first vehicle included in the vehicle group, and may acquire a contribution degree of the first user in the first amount of the biological group based on the second reduction amount of carbon dioxide. The control unit may cause the predetermined display device to display information indicating the first amount of the biological group and the degree of contribution of the first user.

The information processing device is, for example, a server or an in-vehicle device. The in-vehicle device is, for example, a device having a communication function such as a data communication device (DCM), a drive recorder, and a car navigation device. The control unit is, for example, a processor such as Central Processing Unit (CPU) or Digital Signal Processor (DSP). Vehicles included in the vehicle group are vehicles called "eco-cars", such as, for example, battery electric vehicle (EV), fuel cell electric vehicle (FCV), hybrid electric vehicle (HV), plug-in hybrid electric vehicle (PHEV), clean diesel vehicles (CDV), and natural gas vehicles (CNG). Note that the vehicle group may be constituted by one vehicle. The amount of reduction in carbon dioxide emitted by the traveling of these vehicles is, for example, an amount that is reduced compared to the amount of carbon dioxide emitted when the convention car travels at the same distance.

A biological group is, for example, a group of trees, i.e. a forest. However, the biological group is not limited thereto, and may be, for example, any of a group of fruits to be trees, a group of vegetables to be fruited in a field, a group of flowers to be blossomed in a flower bed, and a group of animals. If the biological group is a forest, the quantity of the biological group is, for example, the number of trees or the area of the forest. When the biological group is a fruit group, a vegetable group, and a flower group, the quantity of the biological group is, for example, a number, a quantity, or a planted area. Where the biological group is a group of animals, the quantity of the biological group is, for example, the population number of the animal.

The information indicating the first amount of the biological group may be, for example, the first amount corresponding to the first reduction amount of carbon dioxide emitted from the vehicle group, or may be a virtual object indicating the biological group in a display mode corresponding to the first amount. For example, the virtual object may be an image-data such as an illustration or a photograph of the biological group, or a 3D modeling simulating the biological group. For example, in a case where the biological group is a forest, the display mode of the forest object according to the first amount may be a display mode in which the number of trees included in the forest object increases or decreases according to the first amount. Alternatively, the display mode of the forest object according to the first amount may be, for example, a display mode in which the ratio of the displayed portion of the forest object increases or decreases according to the first amount.

The contribution of the first user based on the second reduction amount of the carbon dioxide emitted from the first vehicle may be expressed, for example, as a ratio of the second reduction amount of the carbon dioxide to the first reduction amount of the carbon dioxide emitted from the vehicle group. Alternatively, the contribution of the first user may be expressed in terms of the amount of biological group obtained by converting the second reduction amount of carbon dioxide. Note that the degree of contribution of the first user is not limited thereto. Note that a plurality of users may be associated with the first vehicle. In this case, it is possible to acquire the amount of reduction in the emission of carbon dioxide due to the operation for each user.

The predetermined display device on which the information indicating the first amount of the biological group and the contribution degree of the first user are displayed is, for example, a display device mounted on the first vehicle or a display device of the user terminal. The user terminal is, for example, a smart phone, a tablet terminal, a PC, or the like.

According to one aspect of the present disclosure, since the amount of reduction in carbon dioxide emitted by the vehicle group is converted into the amount of the biological group and presented, the user can intuitively recognize the amount of reduction in carbon dioxide by the vehicle group. In addition, since the information on the amount of reduction in carbon dioxide is displayed for the vehicle group to which the first vehicle associated with the first user belongs, it is possible to feel a connection with another person that all the users corresponding to the vehicle group are tackling the common goal of reducing the emission of carbon dioxide. Also, in one aspect of the present disclosure, the contribution of the first user in the first amount of the biological group is also displayed, so that interest in reducing carbon dioxide emissions by the vehicle can be enhanced.

In one aspect of the present disclosure, the control unit may acquire the first reduction amount of carbon dioxide and the first amount of the biological group for each of the plurality of vehicle groups, and cause the predetermined display device to display information indicating the first amount of the biological group for each of the plurality of vehicle groups and the contribution degree of the first user. The plurality of vehicle groups may be created based on, for example, geographic information about the vehicle or a vehicle type. The geographic information regarding the vehicle is, for example, a region in which the vehicle is registered, a region in which the vehicle travels frequently, and the like. In addition, the vehicle group may include only one vehicle to which a plurality of users are associated. In this case, the degree of contribution of the user indicates the degree of contribution of each user in the amount of reduction in the emission of carbon dioxide caused by the driving of all the users associated with one vehicle constituting the vehicle group.

According to one aspect of the present disclosure, since the information indicating the first amount of the biological group corresponding to the reduction amount of the carbon dioxide emission is displayed for each of the plurality of vehicle groups, the competitiveness of the respective users corresponding to the plurality of vehicle groups can be instigated, and the interest in the reduction of the carbon dioxide emission amount as a whole can be increased.

Hereinafter, embodiments of the present disclosure will be described with reference to the drawings. The configurations of the following embodiments are illustrative, and the present disclosure is not limited to the configurations of the embodiments.

First Embodiment

FIG. 1 is a diagram illustrating an example of a configuration of a driving diagnosis system 100 according to a first embodiment. The driving diagnosis system 100 according to the first embodiment is a system for evaluating a driving operation of a vehicle. As one of the services of the driving diagnosis system 100, there is a service that provides information on the amount of reduction in carbon dioxide emitted from a vehicle. In the first embodiment, a service for providing information on the amount of reduction in carbon dioxide emitted from the vehicle among the services provided by the driving diagnosis system 100 will be described. Hereinafter, the carbon dioxide is referred to as CO2. Further, the reduction amount of carbon dioxide emitted from vehicles is simply referred to as a CO2 reduction amount.

The driving diagnosis system 100 includes a server 1, a data center 2, and a vehicle 3. Although the driving diagnosis system 100 includes a plurality of vehicles 3, only one vehicle 3 is shown in FIG. 1 for the sake of convenience. The servers 1, the data center 2, and the vehicles 3 are connected to a network N1, and can communicate with each other through a network N1. The network N1 is, for example, a public network such as the Internet.

The vehicles 3 are connected cars connected to a network N1 and capable of communicating with other devices. The vehicle 3 is a so-called eco-car, and is a vehicle that emits less $CO_2$ than a conventional car. The vehicle 3 transmits the vehicle travel information to the data center 2 at a predetermined cycle. The vehicle travel information includes information acquired by various sensors mounted on the vehicle 3. More specifically, the vehicle travel information includes identification information of the vehicle 3, a time stamp, position information, a travel speed, a travel distance, a captured image of an in-vehicle camera, and the like. However, the information included in the vehicle travel information is not limited thereto. In a case where the vehicle 3 is provided for rental, lease, or share service, and in a case where a plurality of users are associated with the vehicle 3 and a user to be driven is desired to be distinguished, the vehicle travel information may include identification information of the user who uses the vehicle 3. The transmission cycle of the vehicle travel information is arbitrarily set by the user of the vehicle 3 or the administrator of the driving diagnosis system 100, for example, between 1 second and 1 minute. The vehicle travel information may also be transmitted when a predetermined event occurs. The events that trigger the transmission of the vehicle travel information include, for example, the ignition on and off of the vehicle 3 and the case where a collision is detected.

The vehicle 3 includes an in-vehicle device in which an application for receiving a driving diagnosis service provided by the driving diagnosis system 100 is installed. For example, the application is activated by a user operation, and a menu corresponding to a service for providing information on the amount of reduction in $CO_2$ is selected, so that the in-vehicle device of the vehicle 3 transmits a request for acquiring information on the amount of reduction in $CO_2$ to the server 1.

The data center 2 collects vehicle travel information of the vehicle 3 and stores the vehicle travel information in a database. The data center 2 is a data center that holds vehicle travel information of all the vehicles 3 registered in the driving diagnosis system 100.

The server 1 acquires vehicle travel information of the newly collected vehicle 3 from the data center 2 at a predetermined cycle. For example, the acquisition cycle of the vehicle travel information is arbitrarily set by the administrator of the driving diagnosis system 100 in a period of 1 minute to 1 hour. For example, when the acquisition cycle of the vehicle travel information is 10 minutes, the server 1 acquires, from the data center 2, the vehicle travel information of all the vehicles 3 registered in the driving diagnosis system 100 newly collected in the last 10 minutes from the last acquisition to the present.

On the basis of the vehicle travel data of the vehicle 3, the servers 1 acquire the reduced amounts of $CO_2$ emissions of the vehicle 3 at predetermined intervals. In the first embodiment, the servers 1 acquire and record the reduced emissions of $CO_2$ of the vehicles 3 on a monthly basis. Further, the server 1 groups the vehicles 3 satisfying a predetermined condition. In the first embodiment, the server 1 groups the vehicles 3 for each registered region. The group creation criterion of the vehicle 3 is not limited to a specific criterion, and may be grouped by, for example, a vehicle type, or may be grouped by a region in which the vehicle travels most frequently.

In response to a request from the vehicle 3 to acquire information on the amount of $CO_2$ reduction, the server 1 converts the amount of $CO_2$ that is equivalent to the amount of $CO_2$ reduction of the group to which the vehicle 3 belongs into the amount of forest that can be absorbed at the same time, and returns a forest object in a display mode corresponding to the amount of the forest. Forest objects change display morphology such that the larger the amount of forest, the larger, the larger the number, or the closer to the complete body. The amount of forest is the number of trees or the forest area.

Further, as the degree of contribution of the user, the servers 1 calculate, for example, the amount of forests obtained by converting $CO_2$ reduction amount of the vehicle 3 corresponding to the user, or the ratio of $CO_2$ reduction amount of the vehicle 3 to $CO_2$ reduction amount of the grouping, and transmit the calculated amount to the vehicle 3. In the first embodiment, it is described that the amount of forests obtained by converting the amount of $CO_2$ reduction of the vehicles 3 corresponding to the user is adopted as the degree of contribution of the user.

Increasing $CO_2$ savings will also increase the amount of forests that can absorb the same amount of $CO_2$ over the same period of time. Therefore, in the first embodiment, the larger $CO_2$ reduction of the group to which the vehicle 3 belongs, the larger the forest object, the larger the number, or the closer to the perfect body. As a result, the user can intuitively recognize $CO_2$ reduction amounts of the groups, and can feel that the user is working to achieve the same goal as the other users. In addition, since the amount of forests converted from $CO_2$ reduction amount of the vehicles 3 is also presented as the contribution degree of the user, the user can recognize the contribution to $CO_2$ reduction due to the traveling of the user himself/herself, and can improve the interest and motivation for $CO_2$ reduction. Further, it is possible to maintain motivation of continuation of use for other driving diagnosis services provided by the driving diagnosis system 100.

Figure 2:
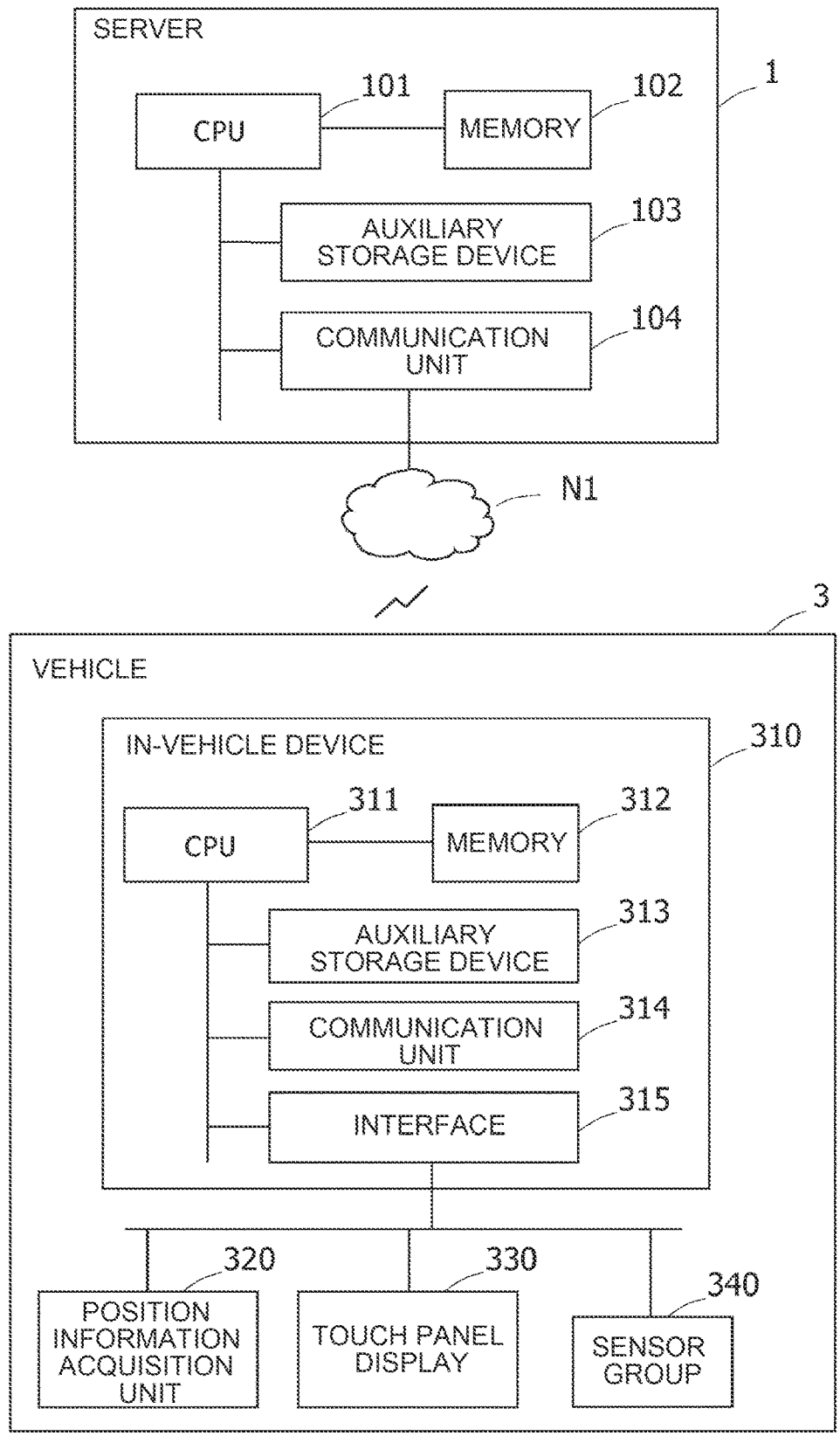
FIG. 2 is a diagram illustrating an example of a hardware configuration of a server and a vehicle.

FIG. 2 is a diagram illustrating an example of a hardware configuration of the server 1 and the vehicle 3. The server 1 includes a CPU 101, a memory 102, an auxiliary storage device 103, and a communication unit 104 as hardware configurations. The auxiliary storage device 103 is, for example, a Hard Disk Drive (HDD) and a Solid State Drive (SSD). The programs held in the auxiliary storage device 103 include, for example, an Operation System (OS) and a plurality of other programs. The memory 102 includes, for example, a solid-state memory such as Read Only Memory (ROM), Random Access Memory (RAM). Each of the memory 102 and the auxiliary storage device 103 is an example of a computer-readable recording medium. In the first embodiment, the server 1 is an example of an "information processing device".

CPU 101 executes various processes by loading and executing various programs, such as OS held in the auxiliary storage device 103, into the memory 102. The number of CPU 101 is not limited to one, and a plurality may be provided. CPU 101 is an exemplary "control unit".

The communication unit 104 is, for example, a module that connects a network cable such as a Local Area Network (LAN) card and an optical module and includes a signal-processing circuit. The communication unit 104 is not limited to a circuit connectable to a wired network, and may be a wireless signal processing circuit capable of processing a wireless signal of a wireless communication network such as WiFi.

Next, in FIG. 2, among the configurations of the vehicle 3, the above-described components related to the provision process of $CO_2$ reduction quantity of the driving diagnosis system 100 are extracted and shown, and the configuration of the vehicle 3 is not limited to that shown in FIG. 2. The vehicle 3 includes an in-vehicle device 310, a position information acquisition unit 320, a touch panel display 330, and a sensor group 340. These components are connected by, for example, a Controller Area Network (CAN) network and an in-vehicle network such as in-vehicle Ethernet.

The position information acquisition unit 320 is, for example, a Global Positioning System (GPS) receiver. The position information acquisition unit 320 acquires the position information of the vehicle 3 at a predetermined cycle. The period at which the position information acquisition unit 320 acquires the position information is set, for example, in a period of 0.1 second to 1 second. The sensor group 340 includes a plurality of sensors such as a camera, a speed meter, an odometer (travel distance meter), and an acceleration sensor. Each of the sensors included in the sensor group 340 performs measurement at a predetermined cycle, and outputs a detection value to the in-vehicle device 310. For example, the detection value of the camera is a captured image. For example, the sensed value of the speed meter is speed. For example, the detected value of the odometer is the cumulative travel distance.

The in-vehicle device 310 is, for example, a data communication device (DCM), a drive recorder having a communication function, a car navigation system, or the like. In FIG. 2, description will be given assuming that the in-vehicle device 310 is a data communication device. The in-vehicle device 310 includes, as hardware configurations, a CPU 311, a memory 312, an auxiliary storage device 313, a communication unit 314, and interfaces 315. CPU 311, the memory 312, and the auxiliary storage device 313 are the same as CPU 101, the memory 102, and the auxiliary storage device 103, respectively.

The communication unit 314 communicates with an external device based on a radio communication scheme such as a mobile communication scheme such as 5G, 6G and 4G, a Wi-Fi, or Dedicated Short Range Communications (DSRC). The interface 315 is an interface for connecting to an in-vehicle network.

In the first embodiment, the in-vehicle device 310 generates vehicle travel information from the detection value of the sensor group 340 at a predetermined cycle, and transmits the vehicle travel information to the data center 2. In addition, the in-vehicle device 310 transmits a request to acquire information on CO2 reduction quantity to the server 1 by the user's manipulation, and displays the received information on the touch panel display 330 as a reply. Hereinafter, for the sake of convenience, the communication of the in-vehicle device 310 will be described as the communication of the vehicle 3. The hardware configuration of the server 1 and the vehicle 3 is not limited to the configuration shown in FIG. 2.

Figure 3:
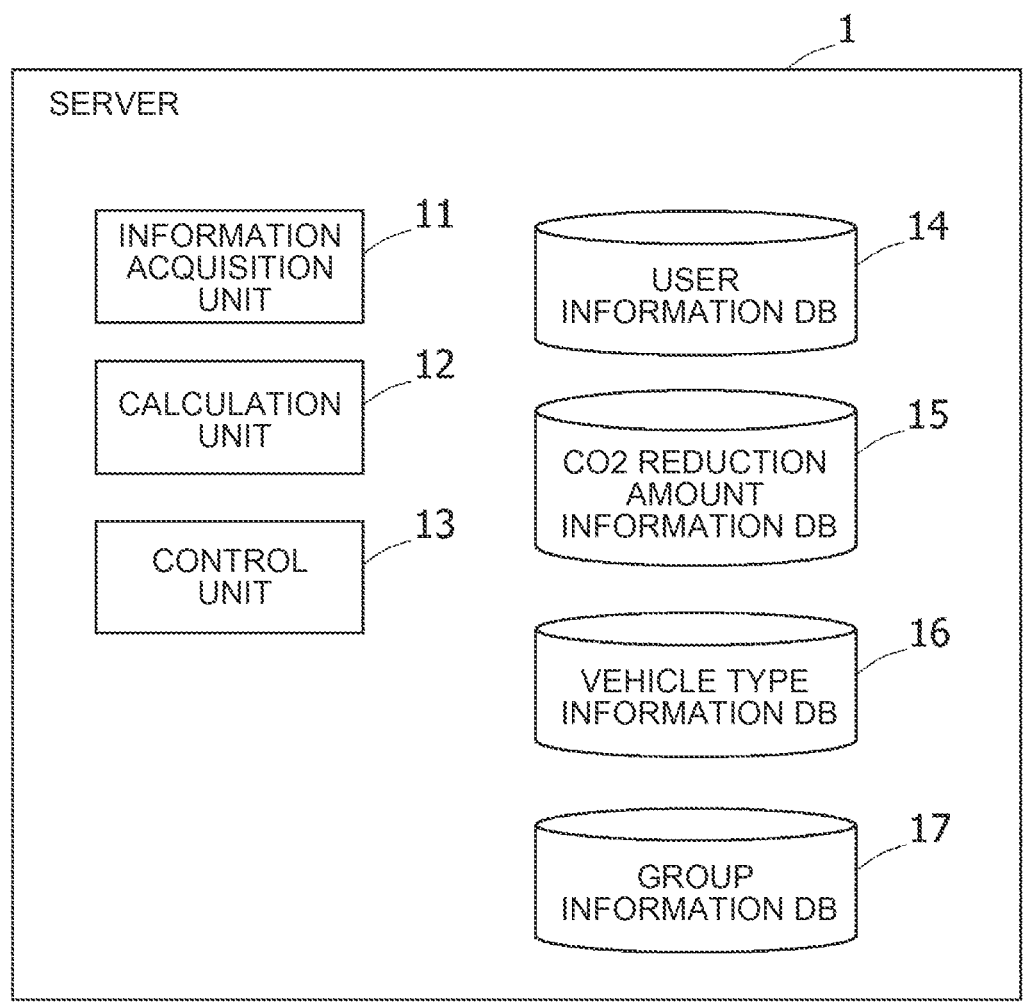
FIG. 3 is a diagram illustrating an example of a functional configuration of a server.

FIG. 3 is a diagram illustrating an example of a functional configuration of the server 1. The server 1 includes, as functional components, an information acquisition unit 11, a calculation unit 12, a control unit 13, a user information DB 14, CO2 reduction amount information DB 15, a vehicle type information DB 16, and a group information DB 17. The functions of these functional components are respectively achieved by executing a predetermined program.

The information acquisition unit 11 accesses the data center 2 at a predetermined cycle, and acquires vehicle travel information of the vehicle 3 registered in the driving diagnosis system 100 for the latest one cycle. Based on the newly acquired vehicle travel information, the calculation unit 12 updates CO2 reduction amount for the current month of the respective vehicles 3 held in CO2 reduction amount information DB 15 to be described later. Details of the processing of the calculation unit 12 will be described later.

The control unit 13 receives, from the vehicles 3, a request to acquire information related to CO2 reduction amount. For example, the identification information of the vehicle 3, the identification information of the user, and the designated month are also received together with the acquisition request. The control unit 13 acquires CO2 reduction amount of the group to which the vehicle 3 belongs and CO2 reduction amount of the vehicle 3 in the designated month by referring to CO2 reduction amount information DB 15. The control unit 13 converts CO2 reduction amount of the group to which the vehicles 3 belong in the designated month to obtain the forest amount. CO2 reduction amount of the group to which the vehicles 3 belong is an example of the "first reduction amount of carbon dioxide". The amount of forests obtained by converting CO2 reduction amount of the group to which the vehicles 3 belong is an example of "the first amount of the biological group". A detailed description of how to convert CO2 savings to forest abundance is provided below.

The control unit 13 acquires the degree of contribution of the user of the identification information received together with the acquisition request based on CO2 reduction of the vehicles 3 in the designated month. In the first embodiment, the contributing degree of the user is acquired as the amount of forests converted from CO2 reduced amount of the vehicles 3 by the driving of the user in the specified month. A detailed description of how to convert CO2 savings to forest abundance is provided below. CO2 reduction amount of the vehicles 3 by the driving of the user is an exemplary "second reduction amount of carbon dioxide".

The control unit 13 determines the display mode of the forest object according to the amount of the forest acquired by the conversion from CO2 reduction amount of the group to which the vehicles 3 belong. For example, in a case where the display mode of the forest object changes such that the number of trees included increases as the amount of the acquired forest increases, the display mode of the forest object is determined such that the number of trees in the forest object is calculated by dividing the amount of the acquired forest of the group by the amount of the forest per tree in the forest object set in advance, and the calculated number of trees is included. For example, if the display aspect of the forest object changes so as to be larger as the amount of the acquired forest is larger, the display aspect of the forest object is determined such that the ratio of the amount of the acquired group of forest to the amount of the forest corresponding to the reference size of the forest object is obtained and the size obtained by multiplying the reference size by the corresponding ratio. For example, if the display aspect of a forest object changes so as to approach the perfect body as the amount of the acquired forest object is larger, the display aspect of the forest object is determined such that the ratio of the amount of forest of the acquired group to the amount of forest that is associated with the perfect body of the forest object is acquired, and the other part is in a state in which only the corresponding portion of the perfect body of the forest object is missing.

The control unit 13 transmits information on CO2 reduction amount to the vehicles 3 as a response to a request to acquire information on CO2 reduction amount. CO2 reduction amount transmitted to the vehicles 3 includes, for example, a forest object of the determined display mode, an amount of the forest obtained by the transformation from CO2 reduction amount of the grouping, and a degree of the user's contribution. However, the information related to CO2 reduction quantity transmitted to the vehicles 3 is not limited to the above information. The forest object of the determined display mode is an example of "information indicating the first quantity of the biological group".

The user information DB 14, CO2 reduction amount information DB 15, the vehicle type information DB 16, and the group information DB 17 are created in the storage area of the auxiliary storage device 103. The user information DB 14 holds information about a user registered in the driving diagnosis system 100. The information about the user held in the user information DB 14 includes, for example, identification information of the user, identification information of the vehicle used by the user, a registered area of the vehicle, a vehicle type of the vehicle, and the like. The registration area of the vehicle may be, for example, a declaration by the user. However, the information about the user held in the user information DB 14 is not limited to these pieces of information. When one user uses a plurality of vehicles, information about the user is held for each vehicle to be used. The use of a vehicle includes the use of an owned vehicle and the use of a vehicle that is rented, leased, or shared.

CO2 reduction amount information DB 15 holds CO2 reduction amount of the vehicles 3 for each user on a monthly basis. Detailed information held in CO2 reduction amount information DB 15 will be described later. The vehicle type information DB 16 stores the fuel efficiency of each vehicle type, that is, the travel distance per liter of gasoline. The fuel consumption for each vehicle type is used to calculate CO2 reduction. The group information DB 17 holds information on the group of vehicles 3.

The information about the group held in the group information DB 17 includes, for example, a group ID, identification information of a group creation criterion, and conditions of the group. Examples of the criteria for creating a group include a registration area of the vehicle 3, a vehicle type of the vehicle 3, and a most frequent traveling area of the vehicle 3. The condition of the group is the condition of the vehicle 3 classified into the group. For example, when the group creation criterion is the vehicle type of the vehicle 3, the condition of the group is information indicating the vehicle type classified into the group. For example, when the creation criterion of the group is the registered area of the vehicle 3, the condition of the group is information indicating the area classified into the group. The functional configuration of the server 1 is not limited to the example illustrated in FIG. 3.

FIG. 4 is a diagram illustrating exemplary information regarding CO2 reduction amounts of the vehicles 3 in the month of X and Y that are held in CO2 reduction amount information DB 15. One record of information on CO2 reduction amount of the vehicle 3 held in CO2 reduction amount information DB 15 includes the following items: user ID, vehicle ID, group ID, mileage, and CO2 reduction amount. In an item for a user ID, identification information of a user is stored. In the vehicle ID items, the identification information of the vehicle 3 is stored. In the items of the group ID, the identification information of the group to which the vehicle 3 belongs is stored. The item of the travel distance stores the cumulative value of the travel distance of the vehicle 3 in X years and Y months. In the items of CO2 reduction amount, the cumulative value of CO2 reduction amount of the vehicles 3 in X years and Y months is stored.

For example, the control unit 13 determines the group to which the vehicle 3 belongs based on the group creation criteria such as the vehicle type of the vehicle 3, the registered area of the vehicle 3, or the most frequent traveling area of the vehicle 3. When the vehicle 3 uses the most frequent traveling area as the group creation standard, for example, the most frequent traveling area of the vehicle 3 may be applied by the user, or the control unit 13 may acquire statistical data of the traveling area of the vehicle 3 from the data center 2 and specify the statistical data from the statistical data.

The travel distance of the vehicle 3 in X years and Y months is acquired by the control unit 13 based on the vehicle travel information collected from the vehicle 3 in X years and Y months. CO2 reduction in X years and Y months of the vehicle 3 is acquired by the control unit 13 using, for example, the travel distance in X years and Y months of the vehicle 3.

Figure 5:
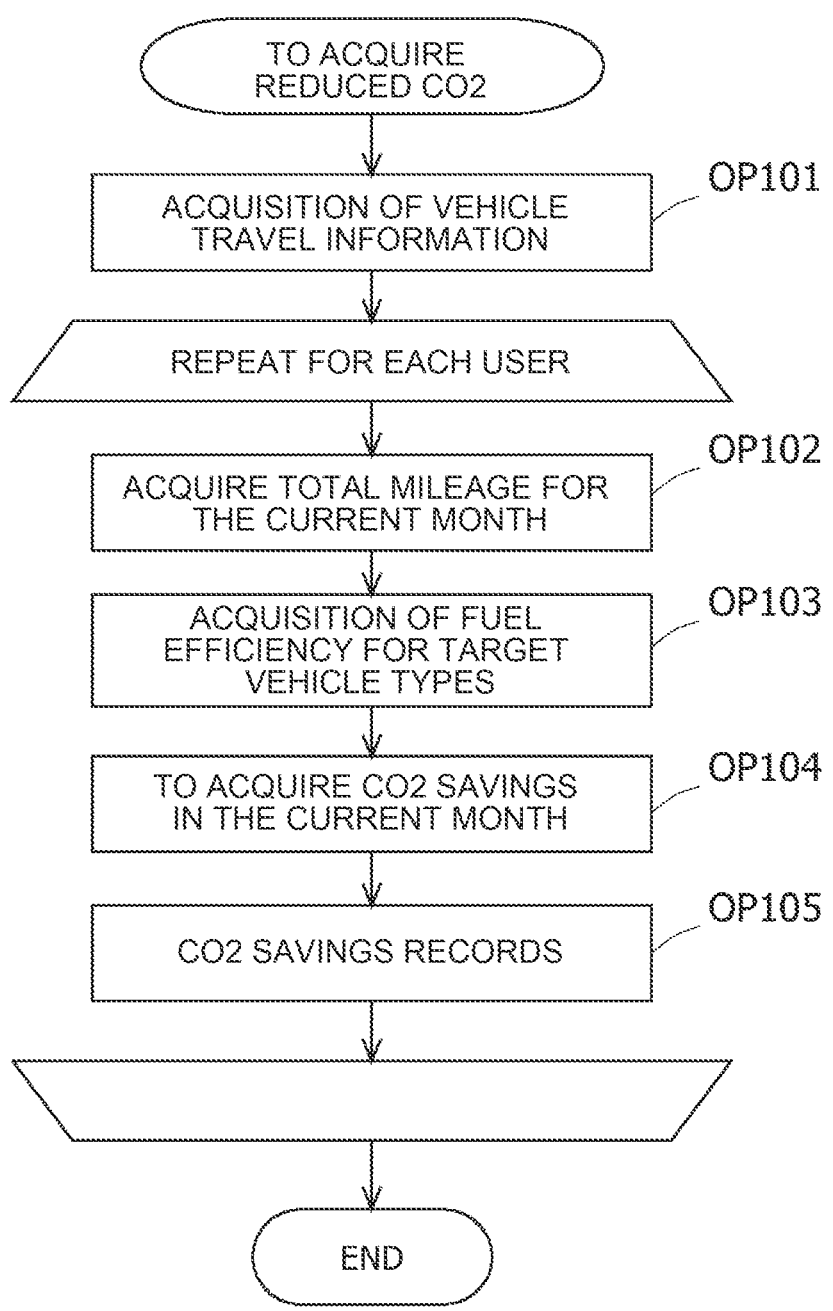
FIG. 5 is an exemplary flow chart of a $CO_2$ reduction-amount acquiring process of servers.

In the embodiment illustrated in FIG. 5, a plurality of records differing in the identification information of the user are shown with respect to the identification information "V001" of the same vehicle 3. This indicates, for example, that a plurality of users is associated with the vehicles 3 of the identification-information "V001". For example, when the vehicle 3 is a leased vehicle and is a vehicle that is jointly leased by a plurality of users, a record relating to the plurality of users is as described above. When the vehicle 3 is jointly leased by a plurality of users, an application program for a service for leasing one vehicle by a plurality of users is installed in the in-vehicle device 310, information of a user driving by the user is input during traveling, and identification information of the user is also added to the vehicle traveling information by the application program. As a result, it is possible to acquire information such as the travel distance for each user, and it is possible to acquire the degree of contribution for each user. When a plurality of users is associated with one vehicle 3, the group to which the vehicle belongs is the same group for all users. Note that the case in which a plurality of users is associated with one vehicle 3 is not limited to the case in which one vehicle is leased by a plurality of users. For example, in a case where there is a plurality of members driving the vehicle 3 in the family, a plurality of users may be associated with one vehicle 3.

FIG. 5 is an exemplary flow chart of CO2 reduction-amount acquiring process of the servers 1. The processing illustrated in FIG. 5 is repeatedly executed, for example, in the same cycle as the cycle in which the information acquisition unit 11 accesses the data center 2. The process illustrated in FIG. 5 is executed by CPU 101 of the servers 1, but for convenience, the functional components will be mainly described. The same applies to the flowcharts appearing after FIG. 5.

In OP 101, the calculation unit 12 receives, from the information acquisition unit 11, the vehicle travel information of the vehicle 3 registered in the driving diagnosis system 100 for one cycle of accessing the data center 2. OP 105 process from OP 102 is executed for each user registered in the driving diagnosis system 100, that is, for each user having a record in CO2 reduction amount information DB 15.

In OP 102, the calculation unit 12 acquires the travel distance of the vehicle 3 caused by the driving of the target user in the current month. When the vehicle 3 and the user are associated with each other on a one-to-one basis, the calculation unit 12 first extracts the latest vehicle travel information and the oldest vehicle travel information for the vehicle 3 associated with the target user in the user information DB 14 from the vehicle travel information acquired by OP 101. The calculation unit 12 acquires the difference distance between the travel distances (cumulative values) included in the extracted two pieces of vehicle travel information. The calculation unit 12 adds the difference distance to the travel distance of the current month of the target user in CO2 reduction amount information DB 15, and acquires the travel distance of the vehicle 3 by the driving of the target user in the current month. When the vehicle 3 and the user are associated with each other in a plurality of pairs, the calculation unit 12 first extracts the latest vehicle travel information and the oldest vehicle travel information including the identification information of the target user and the identification information of the vehicle 3 associated with the target user in the user information DB 14 from the vehicle travel information acquired by OP 101. Thereafter, as in the case where the vehicle 3 and the user are associated with each other on a one-to-one basis, the difference distance between the travel distances (cumulative values) included in the two vehicle travel information is acquired, the difference distance is added to the travel distance of the current month recorded in CO2 reduction amount information DB 15, and the travel distance of the vehicle 3 by the driving of the target user of the current month is acquired.

In OP 103, the calculation unit 12 acquires the fuel efficiency of the vehicle type of the vehicle 3 associated with the target user from the vehicle type information DB 16. In OP 104, the calculation unit 12 calculates CO2 reduction of the vehicle 3 due to the driving of the target user in the current month by using the travel distance acquired by OP 102 and the fuel consumption of the vehicle 3 acquired by OP 103. CO2 reduction is obtained using Equation 1 below.

$$\text{CO2 reduction} = \text{mileage} \times \text{CO2 emission factor} \times (1/\text{fuel efficiency of convention car} - 1/\text{fuel efficiency of target vehicles}) \quad \text{(Equation 1)}$$

CO2 emission factor is the quantity of CO2 emitted per 1 L of gasoline. It is assumed that the same value is used for the fuel efficiency of the convention car for any of the vehicles 3. For example, when the mileage 10 km, CO2 emission factor is 2.36 kg/L, the fuel efficiency of the convention car is 14.6 km/L, and the fuel efficiency of the target vehicle 3 is 20 km/L, CO2 reduction is 0.43 kg.

In OP 105, the calculation unit 12 updates, with CO2 reduction amount acquired by OP 104, CO2 reduction amount of the vehicles 3 by the driving of the target user in the current month in CO2 reduction amount information DB 15. At this time, the calculation unit 12 also updates the travel distance of the vehicle 3 by the driving of the target user of the current month in CO2 reduction amount information DB 15 with the travel distance acquired by OP 102. After that, the processing for the target user is ended, the processing from OP 102 is performed for the subsequent user, and the processing of OP 105 from OP 102 is ended for all the users, and then the processing shown in FIG. 5 is ended.

In FIG. 5, the total travel distance of the vehicle 3 by the driving of the target user in the current month is acquired, and CO2 reduction amount corresponding to the total travel distance is acquired, so that CO2 reduction amount of the vehicle 3 by the driving of the target user in the current month is acquired, but the present disclosure is not limited thereto. For example, CO2 reduction amount corresponding to the difference distance between the latest vehicle travel information and the oldest vehicle travel information about the vehicle 3 by the driving of the target user among the vehicle travel information acquired by OP 101 may be acquired, and may be added to CO2 reduction amount of the vehicle 3 by the driving of the target user of the current month in CO2 reduction amount information DB 15 to acquire CO2 reduction amount of the vehicle 3 by the driving of the target user of the current month.

Figure 6:
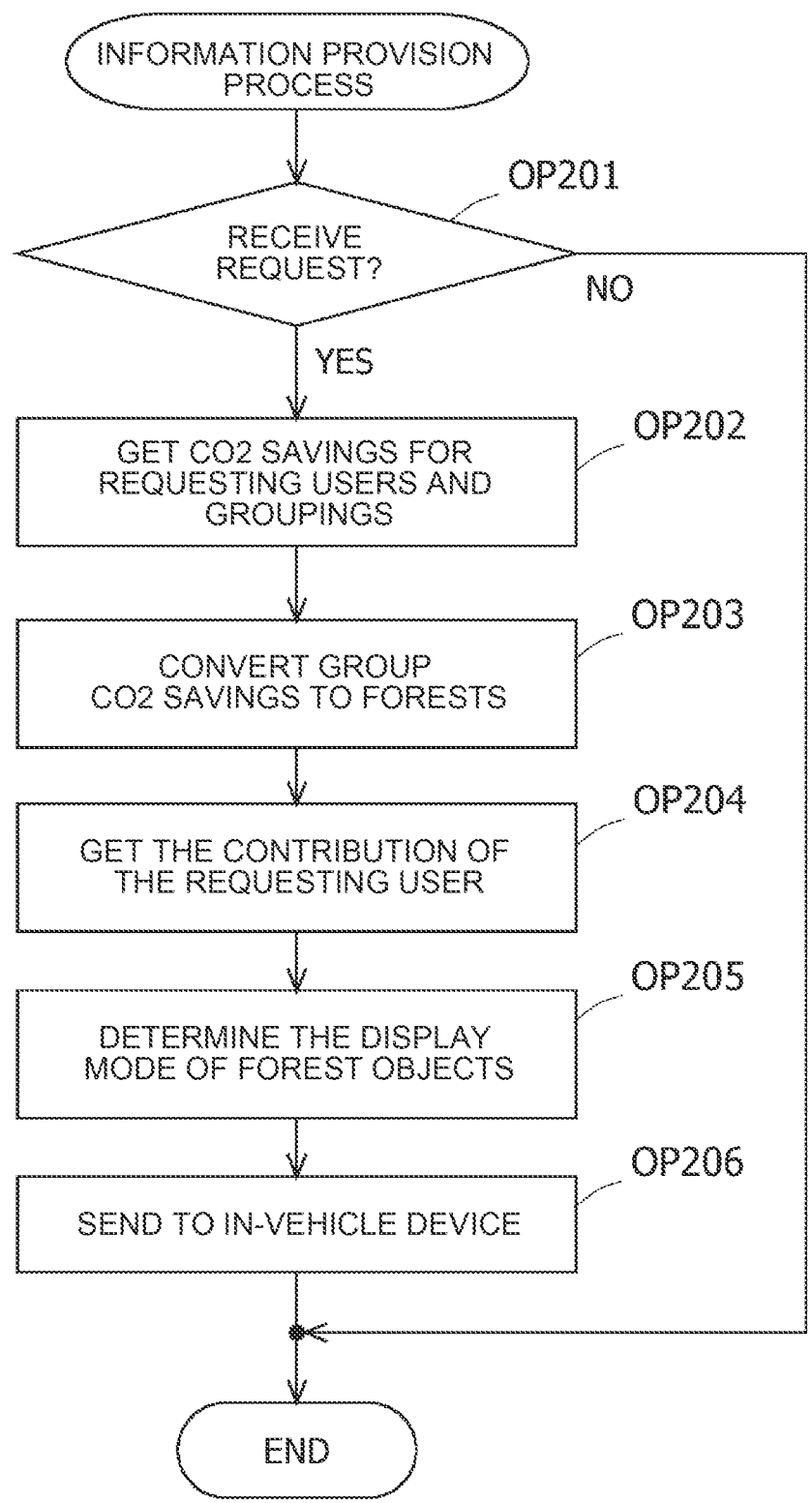
FIG. 6 is an exemplary flow chart of a process of providing $CO_2$ reduction-related information of servers.

FIG. 6 is an exemplary flow chart of a process of providing CO2 reduction data of the servers 1. The processing illustrated in FIG. 6 is repeatedly executed at a predetermined cycle.

In OP 201, the control unit 13 determines whether or not a request to acquire CO2 reduction-amount-related data has been received from the vehicles 3. When the acquisition request is received (OP 201: YES), the process proceeds to OP 202. When the acquisition request is not received (OP 201: NO), the process illustrated in FIG. 6 ends.

In OP 202, the control unit 13 acquires, from CO2 reduction amount information DB 15, CO2 reduction amount of the vehicle 3 by driving the request source user for the designated month and CO2 reduction amount of the group to which the vehicle 3 associated with the user belongs. CO2 reduction amount of the group to which the vehicle 3 associated with the requesting user belongs in the designated month is obtained by summing CO2 reduction amount in the record in which the identification information of the group to which the vehicle 3 belongs and the identification information of the group are the same for the designated month in CO2 reduction amount information DB 15. Hereinafter, a group to which the vehicle 3 associated with the user of the request source belongs is simply referred to as a target group.

In OP 203, the control unit 13 converts CO2 reduction amount of the target group into the forest amount. As an example, a case where the amount of forest is calculated by the area of the forest will be described. The quantity of CO2 absorbed by 1 hectare of Japanese cedar plantation forest in one year is 8.8 tonnes, so it is 733 kg/ha to convert per month. If CO2 savings for the designated month are 365 kg, the forest volume is estimated to be about 0.5 hectares. When the amount of forests is expressed as the number of trees, the amount of CO2 that a tree absorbs per month can be used to convert the amount of CO2 reduced in the target grouping into the number of trees.

In OP 204, the control unit 13 converts CO2 reduction amount of the vehicle 3 by driving the user of the request source in the designated month acquired by OP 202 as the degree of contribution of the user of the request source, and acquires the amount of the forest.

In OP 205, the control unit 13 determines the display mode of the forest object of the target group according to the quantity of the forest of the target group acquired by OP 203. The determination of the display mode of the forest object is as described above. For example, in a setting in which one whole-body forest object is displayed for each hectare of the forest area, if the forest area of the target group is 0.5 hectares, the forest object of the target group is determined to be a display mode in a half-missing state.

In OP 206, the control unit 13 transmits, to the vehicle 3, CO2 reduction amount-related information in response to the obtaining request. The information on CO2 savings transmitted to the vehicles 3 in OP 206 includes, for example, a forest object of a display mode determined by OP 205, the amount of forest of the target group, and the contribution of the user of the request source (the amount of forest). Note that the information included in the information regarding CO2 reduction amounts transmitted to the vehicles 3 is not limited to these. When CO2 reduction-amount-related information is received, for example, a screen such as the screen illustrated in FIG. 1 is displayed on the touch panel display 330 of the vehicle 3. After that, the processing shown in FIG. 6 is terminated.

Action Effect of First Embodiment

According to the first embodiment, the user of the vehicle 3 can recognize CO2 reduction amount of the group to which the vehicle 3 belongs and the contributing degree of the user in CO2 reduction amount of the group. The amount of CO2 reduced in the grouping to which the vehicles 3 belong is replaced by the amount of forest, and is displayed as a forest object in a display form corresponding to the amount of the forest. Since forests are known to absorb CO2, the use of forest objects makes it possible for users to intuitively recognize CO2 savings and to gain a sense of contributing to environmental issues. By displaying the degree of contribution of the user in CO2 reduction amount, the user can be made aware of environmental issues, and interest in reducing CO2 emissions of the drivers (users) of the vehicles can be increased.

In addition, in the first embodiment, the provision service of the information regarding CO2 reduction amount is one of the driving diagnosis services provided by the driving diagnosis system 100. Therefore, it is possible to maintain the desire to continue using the driving diagnostic service by providing CO2 reduction-related information. Further, it is one of driving diagnosis services provided by the driving diagnosis system 100 to the in-vehicle device 310. Therefore, if an application for receiving the driving diagnosis service is installed in the in-vehicle device 310, the vehicle 3 of the driving diagnosis system 100 is provided only by traveling by providing the information related to CO2 reduction. Therefore, the user does not need to operate in order to receive the provision service of the information regarding CO2 reduction quantity, and the user only needs to drive the vehicle 3.

In the first embodiment, the administrator of the driving diagnosis system 100 can freely set the conditions for creating the group of vehicles. For example, in a case where a plurality of users is associated with one vehicle 3, such as in a case where one vehicle 3 is leased by a plurality of users, the vehicle 3 may be a single group. The group including only the vehicle 3 corresponds to a plurality of users associated with the vehicle 3. In this case, the user can recognize his or her contribution in the group including only the vehicle 3.

Note that one vehicle 3 belongs to only one group in a plurality of groups created based on a predetermined creation criterion. However, the vehicle 3 can belong to a group created by a creation criterion different from the predetermined creation criterion. For example, when the vehicle 3 belongs to the group A of the vehicle type corresponding to the vehicle 3, it cannot belong to the group B of the other vehicle type. On the other hand, while the vehicle 3 belongs to the group A, it can belong to the group X of the region in which the vehicle 3 is registered, but cannot belong to the group Y of the other region. In this way, when there is a plurality of creation criteria for a group, the user can select, from the menu of the application, which of the created criteria is to be used for displaying CO2 reduction amount. The information on the creation criterion of the selected grouping may be transmitted to the server 1 together with a request for obtaining information on CO2 reduction quantity.

MODIFIED EXAMPLES

In the first embodiment, the servers 1 seek the information about CO2 reduction quantity for the group to which the vehicle 3 belongs, which is associated with the user of the request source, and transmit the information to the vehicle 3. In this case, the user can recognize the information on CO2 reduction amount for the group to which the vehicle 3 (the user himself) belongs, but cannot know the information on CO2 reduction amount for the other group. In a modification, the server 1 acquires, in addition to the group to which the vehicle 3 associated with the user of the request source belongs, the information about CO2 reduction amounts for the plurality of other groups, and transmits the information to the vehicle 3. In this case, the servers 1 may execute, for example, the processes of OP 202, OP 203 and OP 205 in FIG. 6 for the respective groups, and obtain CO2 reduction amounts of the groups and the display modes of the forest objects.

Figure 7:
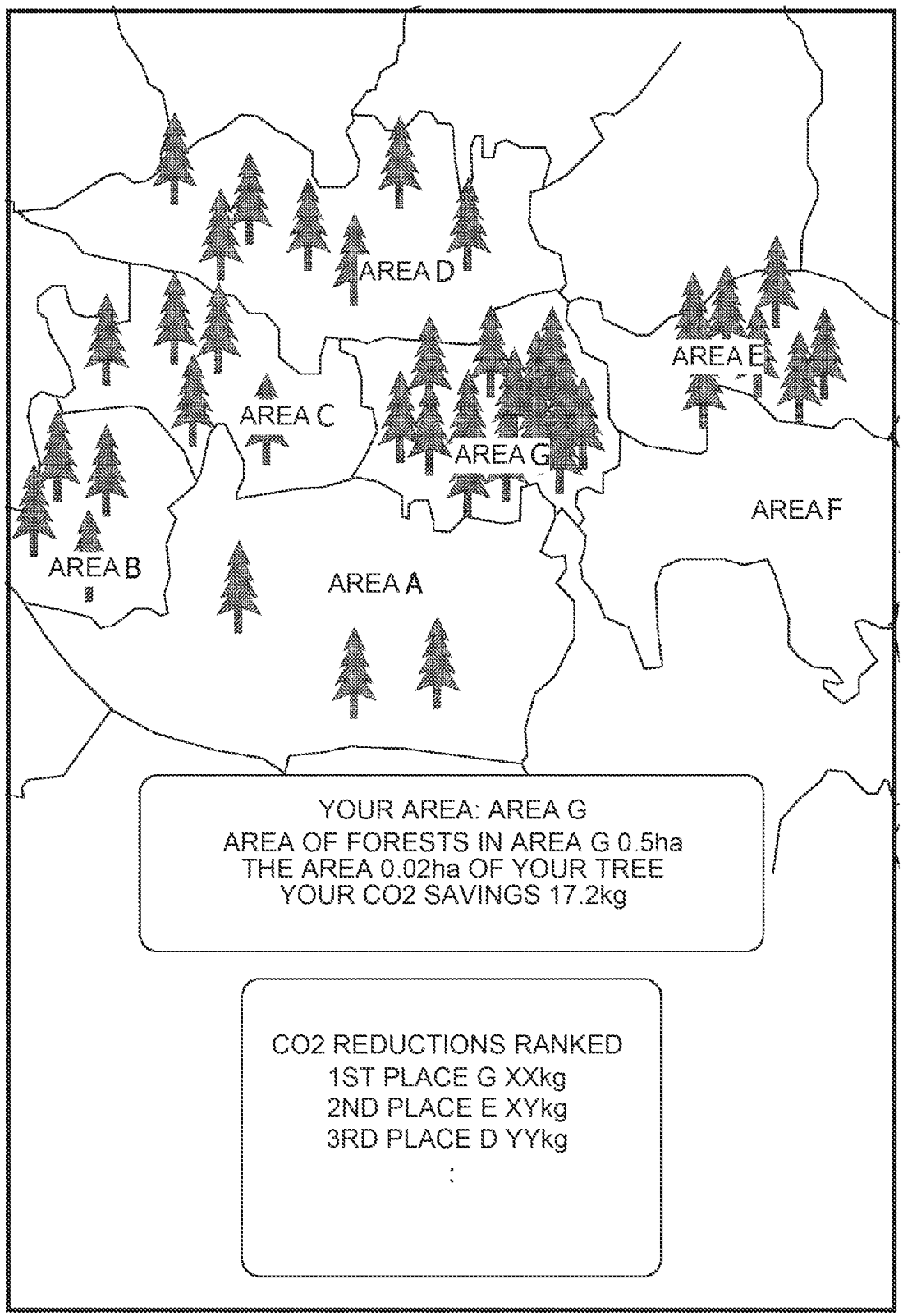
FIG. 7 is a diagram illustrating an example of an example of a $CO_2$ reduction-amount-related display for a plurality of groups according to a modification.

FIG. 7 is a diagram illustrating an example of an example of a CO2 reduction-amount-related display for a plurality of groups according to a modification. In FIG. 7, a plurality of vehicles 3 are grouped according to a registered region. Therefore, the area name=group name. The amount of forest is indicated by the number of trees. The group to which the vehicle 3 corresponding to the requesting user belongs is the area G. In FIG. 7, as the information regarding CO2 reduction amount of the area G to which the vehicle 3 corresponding to the user of the request source belongs, the forest object of the area G, the amount of the forest of the area G (forest area), the contributing degree of the user of the request source (forest area), and CO2 reduction amount due to the driving of the vehicle 3 of the user of the request source are shown.

In the example shown in FIG. 7, in addition to the area G to which the vehicle 3 corresponding to the user of the request source belongs, area A, area B, area C, area D, area E around area G, and the forest object and CO2 reduction of area F are also shown. The forest objects in each of these areas are arranged and displayed on a map indicating the arrangement of each area. The control unit 13 of the server 1 may arrange the forest objects of each group on the map, create a screen as shown in FIG. 7, and transmit the screen to the vehicle 3 when the creation criterion of the group is based on the geographical information about the vehicle 3.

In addition, in FIG. 7, the rankings of the groups (areas) in descending order of CO2 reduction amounts are also displayed. The control unit 13 of the server 1 may rank CO2 reduction amounts, transmit the ranking information to the vehicle 3, and cause the vehicle 3 to display the ranking information. In the example illustrated in FIG. 7, the group in which the forest object is displayed on the touch panel display 330 may be only a part of the grooves. The range in which the forest object is displayed may be changeable by a user operation. The ranking displayed in the example illustrated in FIG. 7 may be a ranking between a plurality of groups (areas) within a range in which a forest object is displayed, or may be a ranking between all groups (areas) including a group (area) outside the range in which the forest object is displayed.

As illustrated in FIG. 7, by presenting the user with the information regarding CO2 reduction amounts for the other groups in addition to the group to which the vehicles 3 corresponding to the user belong, it is possible to raise the competitiveness of the user, and thus it is possible to improve the interest in CO2 reduction.

OTHER EMBODIMENTS

The above-described embodiment is merely an example, and the present disclosure may be appropriately modified and implemented without departing from the scope thereof.

In the first embodiment, the server 1 creates information on CO2 reduction amount, but the present disclosure is not limited thereto, and the server 1 and the in-vehicle device 310 may cooperatively create information on CO2 reduction amount. For example, the server 1 may execute CO2 reduction amount obtaining process illustrated in FIG. 5, and the in-vehicle device 310 may execute the information providing process illustrated in FIG. 6. The in-vehicle device 310, CO2 reduction amount of the vehicle 3 to be installed itself, and CO2 reduction amount of the group to which the vehicle 3 belongs, inquires to the server 1 acquires, determines the amount of the forest of the group and the state of the forest object, acquires the degree of contribution of the user, and may be output to the touch panel display 330. In this case, the in-vehicle device 310 is an example of an "information processing device".

In the first embodiment, the forest object is used as the object representing CO2 reduction of the grouping, but the present disclosure is not limited thereto. For example, the object representing CO2 reduction amount of the group may be a plant that is a target for growing vegetables, fruits, crops, flowers, and the like, or may be a predetermined animal. In addition, the object representing CO2 reduction of the group may be a group of these objects. When the object representing CO2 reduction amount of the group is an object indicating any of the above-described organisms, if CO2 absorption amount of the organism is known, CO2 reduction amount of the group may be converted into the amount of the organism (planting area, amount, and number), and the displaying mode of the object may be determined according to the amount of the organism. If CO2 of the organism is not known, the relation between the amount of the forest and the amount of the organism may be determined in advance, the amount of CO2 reduction may be converted into the amount of the forest, and the amount of the forest may be further converted into the amount of the organism, so that a display mode of the object may be determined according to the amount of the organism. In this case, the quantity of the organism of the group is notified to the vehicle 3.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, HDD, etc.) and an optical disc (compact disc read-only memory (CD-ROM), digital versatile disc (DVD), Blu-ray disc, etc.), a ROM, a RAM, an EPROM, an electrically erasable programmable read only memory (EEPROM), a magnetic card, a flash memory, an optical card, and any type of medium suitable for storing electronic commands.

What is claimed is:

1. An information processing device that includes a control unit that executes:
   acquiring a first reduction amount of carbon dioxide emitted from a vehicle group;
   acquiring a second reduction amount of carbon dioxide emitted from a first vehicle included in the vehicle group through driving by a first user associated with the first vehicle;
   converting the first reduction amount of carbon dioxide into a first amount of a biological group;
   acquiring a degree of contribution of the first user in the first amount of the biological group based on the second reduction amount of carbon dioxide; and
   displaying, on a predetermined display device, information indicating the first amount of the biological group and the degree of contribution of the first user.

2. The information processing device according to claim 1, wherein the control unit
   acquires, for each of the multiple vehicle groups, the first reduction amount of carbon dioxide and the first amount of the biological group, and
   displays, on the predetermined display device, information indicating the first amount of the biological group for each of the vehicle groups and the degree of contribution of the first user.

3. The information processing device according to claim 2, wherein:
   the vehicle groups are created based on geographic information about vehicles for multiple vehicles; and
   the control unit causes the predetermined display device to display information indicating the first amount of the biological group for each of the vehicle groups in a corresponding area on a map.

4. The information processing device according to claim 1, wherein:
   the biological group is a forest;
   an amount of the biological group is the number of trees included in the forest or an area of the forest; and
   the control unit
       acquires, as the first amount of the biological group, the number of trees or an area of the forest in which the same amount of carbon dioxide as the first reduction amount of carbon dioxide is able to be absorbed, and
       acquires, as the degree of contribution of the first user, the number of trees or an area of the forest in which the same amount of carbon dioxide as the second reduction amount of carbon dioxide is able to be absorbed.

5. A method in which a computer executes:
   acquiring a first reduction amount of carbon dioxide emitted from a vehicle group;
   acquiring a second reduction amount of carbon dioxide emitted from a first vehicle included in the vehicle group through driving by a first user associated with the first vehicle;
   converting the first reduction amount of carbon dioxide into a first amount of a biological group;
   acquiring a degree of contribution of the first user in the first amount of the biological group based on the second reduction amount of carbon dioxide; and
   displaying, on a predetermined display device, information indicating the first amount of the biological group and the degree of contribution of the first user.

* * * * *